US006839797B2

(12) United States Patent
Calle et al.

(10) Patent No.: US 6,839,797 B2
(45) Date of Patent: Jan. 4, 2005

(54) MULTI-BANK SCHEDULING TO IMPROVE PERFORMANCE ON TREE ACCESSES IN A DRAM BASED RANDOM ACCESS MEMORY SUBSYSTEM

(75) Inventors: Mauricio Calle, Austin, TX (US); Ravi Ramaswami, Austin, TX (US)

(73) Assignee: Agere Systems, Inc., Allentown, PA (US)

( * ) Notice: Subject to any disclaimer, the term of this patent is extended or adjusted under 35 U.S.C. 154(b) by 241 days.

(21) Appl. No.: 10/026,352

(22) Filed: Dec. 21, 2001

(65) Prior Publication Data

US 2003/0120861 A1 Jun. 26, 2003

(51) Int. Cl.[7] ............................................. G06F 12/00
(52) U.S. Cl. ..................... 711/5; 711/105; 711/158; 711/168; 710/17; 710/28; 710/20; 710/21; 710/35; 710/36; 710/39; 710/40; 710/52
(58) Field of Search ............................ 711/5, 105, 106, 711/151, 158, 168; 710/17, 28, 20, 21, 35–36, 39–40, 52

(56) References Cited

U.S. PATENT DOCUMENTS

| | | | | |
|---|---|---|---|---|
| 5,953,318 A | * | 9/1999 | Nattkemper et al. | 370/236 |
| 5,999,518 A | * | 12/1999 | Nattkemper et al. | 370/258 |
| 6,006,307 A | * | 12/1999 | Cherukuri | 711/114 |
| 6,049,541 A | * | 4/2000 | Kerns et al. | 370/365 |
| 6,058,451 A | * | 5/2000 | Bermingham et al. | 711/106 |
| 6,137,807 A | * | 10/2000 | Rusu et al. | 370/429 |
| 6,360,285 B1 | * | 3/2002 | Fenwick et al. | 710/17 |
| 6,501,690 B2 | * | 12/2002 | Satoh | 365/201 |
| 6,529,429 B2 | * | 3/2003 | Cowles et al. | 365/201 |
| 2001/0030900 A1 | * | 10/2001 | Kawaguchi et al. | 365/222 |
| 2003/0046477 A1 | * | 3/2003 | Jeddeloh | 710/316 |
| 2003/0115403 A1 | * | 6/2003 | Bouchard et al. | 711/5 |

FOREIGN PATENT DOCUMENTS

| | | |
|---|---|---|
| EP | 0 274 426 A2 | 7/1988 |
| GB | 2 346 233 A | 8/2000 |
| WO | WO 03/042836 A1 | 5/2003 |

* cited by examiner

*Primary Examiner*—Mano Padmanabhan
*Assistant Examiner*—Jasmine Song

(57) ABSTRACT

A method and system of memory management incorporates multiple banks of memory devices organized into independent channels wherein each bank of memory devices contains duplicate data. A tree memory controller controls data read and write accesses to each of the banks in each of the channels. A bank queue for each bank in each channel keeps track of bank availability. When read or write requests are received at the tree memory controller, the controller checks the availability of each bank in a channel, identifies a first available bank, and executes the read request from the first available bank. In response to a write request, the controller blocks all read requests once it has confirmed that data to be written is complete for the selected memory word length. As soon as each bank queue for read requests is empty, the controller initiates burst mode transfer of the completed data word to all banks concurrently.

13 Claims, 3 Drawing Sheets

MULTI-BANK SCHEDULING TO IMPROVE PERFORMANCE ON TREE ACCESSES IN A DRAM BASED RANDOM ACCESS MEMORY SUBSYSTEM

FIELD OF THE INVENTION

The present invention relates generally to high speed memory systems and, more particularly, to a memory system using DRAM's with near SRAM performance.

BACKGROUND OF THE INVENTION

A network processor generally controls the flow of packets between a physical transmission medium, such as a physical layer portion of an asynchronous transfer mode (ATM) network or synchronous optical network (SONET), and a switch fabric in a router or other type of packet switch. Storage technology in network processors utilizes DRAMs (dynamic random access memories) to provide large storage capacity with low power consumption. However, as the speed of processors and memory buses continues to increase, so also do the memory access speed requirements in order to meet overall system performance demands. The speed of SRAMs (synchronous random access memory) can accommodate these speeds. However, SRAM memory capacity is typically an order of magnitude lower than DRAM memory. Also, SRAMs typically have two orders of magnitude higher power consumption requirements than DRAMs. Therefore, it is desirable to achieve SRAM performance utilizing DRAM.

DRAMs within or otherwise associated with a network processor are typically arranged in the form of multiple memory banks. Consecutive read or write accesses to an address or addresses within a given one of the banks will require waiting a random cycle time Trc for completion of a required access pre-charge process. However, consecutive accesses to even the same address within different banks do not experience this Trc wait time, which is also referred to herein as the bank conflict penalty. Static random access memories (SRAMs) avoid the bank conflict penalty altogether. That is, any address in the memory can be accessed in a fixed time without incurring the Trc wait time associated with DRAMs.

A number of DRAMs known in the art are specifically configured to reduce the Trc wait time described above. For example, a so-called fast cycle DRAM (FCDRAM) is particularly designed to exhibit a minimal Trc. A more particular example of an FCDRAM, commercially available from Toshiba, is identified by part number TC59LM814CFT-50. In this particular type of FCDRAM, the random cycle time Trc is limited to 5T, where T denotes the memory clock period. A memory access, either read or write, requires two clock periods, and maximum data throughput is achieved by using a so-called "four-burst" mode. For example, using a 200 MHz memory clock and an FCDRAM configured in four banks, with each of the banks including 4M memory words of 16 bits each, the memory clock period T is 5 nanoseconds and Trc is 25 nanoseconds, and the maximum data throughput using the four-burst mode is approximately 6.4 Gigabits per second (Gbps). However, if consecutive memory accesses go to the same one of the four banks, the data throughput is reduced to approximately 2.5 Gbps, as a result of the Trc wait time.

As is apparent from the foregoing, a need exists for an improved DRAM-based memory architecture, for use in conjunction with a network processor or other processing device, which can provide the storage capacity and low power consumption advantages of DRAMs while also providing the advantage of SRAMs in terms of performance.

SUMMARY OF THE INVENTION

Among the several features and advantages of the present invention is a method to achieve near SRAM performance using DRAM memory. In an exemplary embodiment, the invention uses FCRAM (Fast Cycle DRAM) for the best performance. However, the present invention provides such high speed memory performance through a method of multi-bank scheduling to reduce time requirements on tree accesses in a DRAM based random access memory subsystem.

In an illustrative form, at least two independent FCRAM channels are used with independent address-data-control lines to achieve 10 Gbps throughput. The entire data in a first Channel 0 memory is duplicated in a second Channel 1 memory. The memory controller receives a stream of access read requests to random addresses, A0, A1, A2, A3, A4, etc., and schedules a stream of requests to the two channels which balances the load and minimizes bank conflicts. The controller maintains multiple queues, one per bank of FCRAM memory in each channel. The read address from the tree engine is decoded to extract the bank address, and the request is stored in the appropriate bank queue. The controller also maintains a bank conflict counter per bank per channel, which is loaded with the Trc value after a read request has been sent to the appropriate bank. All bank conflict counters are decremented on each clock and when a bank conflict counter is zero, the corresponding bank becomes available. The controller also maintains a pointer to the queue that was last serviced.

On each clock the controller dispatches the request from the next available bank queue, in round-robin fashion, starting from the queue last serviced, i.e., using a work-conserving round-robin algorithm, to either Channel 0 or Channel 1, whichever is available. A bank queue is available if it is non-empty, and the corresponding bank-conflict-counter is zero. A channel is available if a request can be sent, and the bank accessed is not busy. If none of the bank queues are available, then no request is sent to the FCRAMs.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

The disclosed methods near SRAM performance using DRAM memory where the expected tree memory usage has greater than 95% reads and less than 5% writes. While these methods are applicable to any DRAM memory, it is believed that the best performance is obtained using dual-data-rate FCRAMs (fast cycle DRAM), such as Toshiba TC59LM814/06CFT. In this particular FCRAM, there is a small random cycle time (Trc) of 5 ns. Memory access in these devices (read or write) requires two clock periods. Maximum data throughput for this device is achieved using a four-burst mode. As an example, a 200 Mhz 4 bank×4M× 16 bits FCRAM in a 4-burst mode achieves a maximum data throughput of approximately 6.4 Gbps. The details of burst mode operation are set forth in the specification documents provided by the manufacturer of the devices.

In tree memory structures contemplated by the present invention, DRAM's, such as the above described FCRAM's, are organized in banks. Consecutive memory access to addresses within these banks requires waiting for the expiration of the random cycle time. The random cycle time (Trc) is the time necessary for a pre-charge to be completed, i.e., after each read or write to a bank, the bank must be refreshed. However, consecutive memory access to addresses in different banks is not constrained by the random cycle time.

Achieving substantially random access capability, using FCRAMs without the bank conflict penalty, is accomplished by storing identical data copies in different banks and sending successive memory access requests to different banks. The minimum number of data copies required is determined by the ratio of the random cycle time to the random bank access delay as shown in the equation below:

$$(Trc/Trbd) \geq 25 \text{ ns}/10 \text{ ns} = 3 \text{ banks}$$

Where:

Trc=5T,

Trbd=10 ns, and

T=memory clock period.

Two independent FCRAM channels are used to achieve 10 Gbps read throughput, each with its own address-data-control lines. A total of six memory banks are required; three banks in Channel 0 and three banks in Channel 1. All six banks contain identical data. However, it will be appreciated that greater than 10 Gps throughput can be achieved by using other channel and bank combinations. The use of two channels is described for illustration purposes only and is not to be interpreted as limiting the invention to such embodiment.

Figure 1:
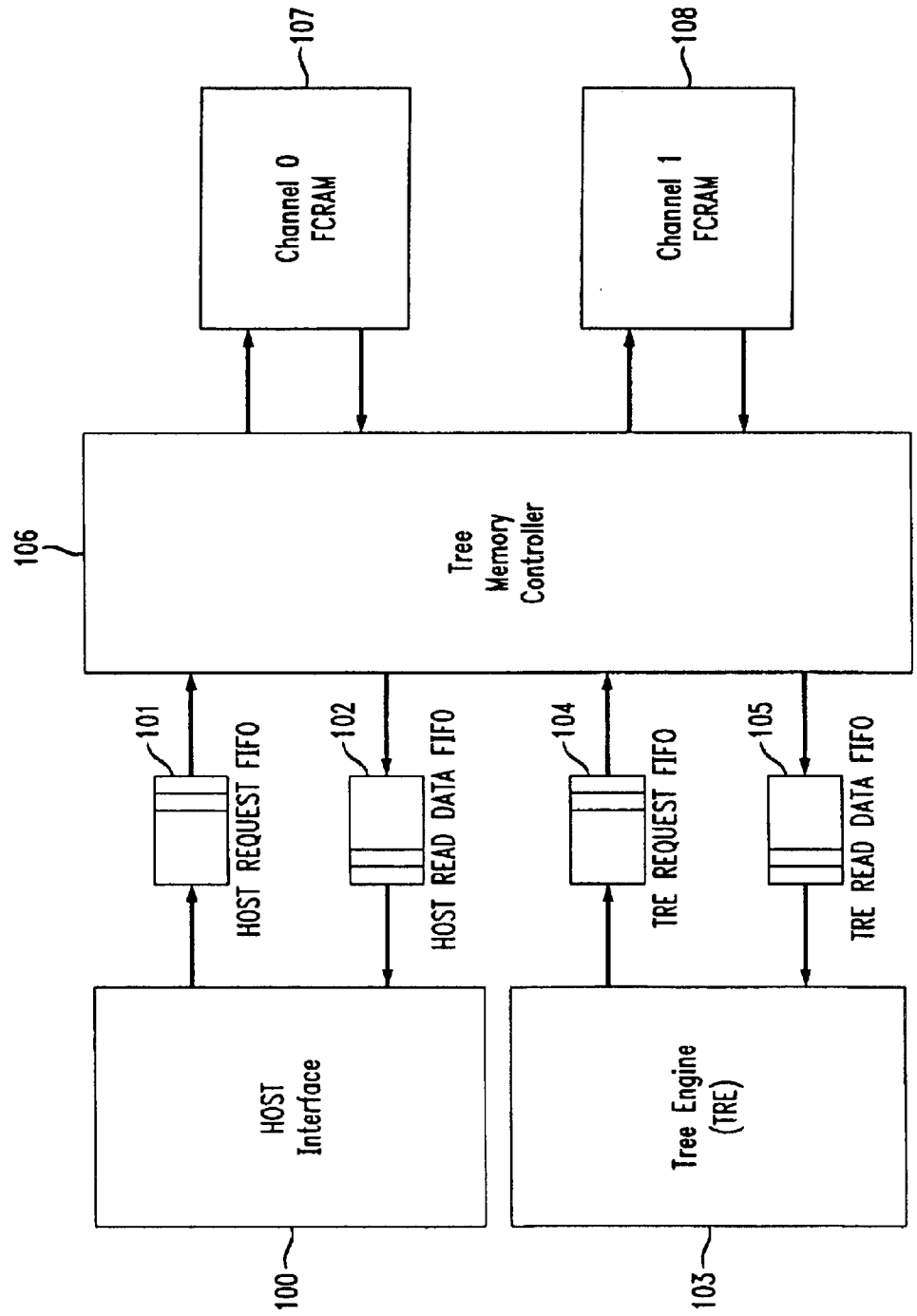
FIG. 1 is a block interface diagram indicating data flow.

As indicated in FIG. 1, the Tree Engine 103 sends a stream of access read requests (TRE Request FIFO 104) to the Tree Memory Controller 106. Up to one request per 200 Mhz core clock speed or every 5.0 nanoseconds may be generated by the Tree Engine 103. Channel 0 FCRAM 107 and Channel 1 FCRAM 108 are independent. Thus, the Tree Memory Controller 106 can execute an average of one memory read every 5 ns using Channel 0 FCRAM 107 and Channel 1 FCRAM 108. Dual-clock synchronization is used for TRE Request FIFO 104 to transmit read requests to the Tree Memory Controller 106 and TRE Read FIFO 105 to return data back to the Tree Engine 103.

Figure 2:
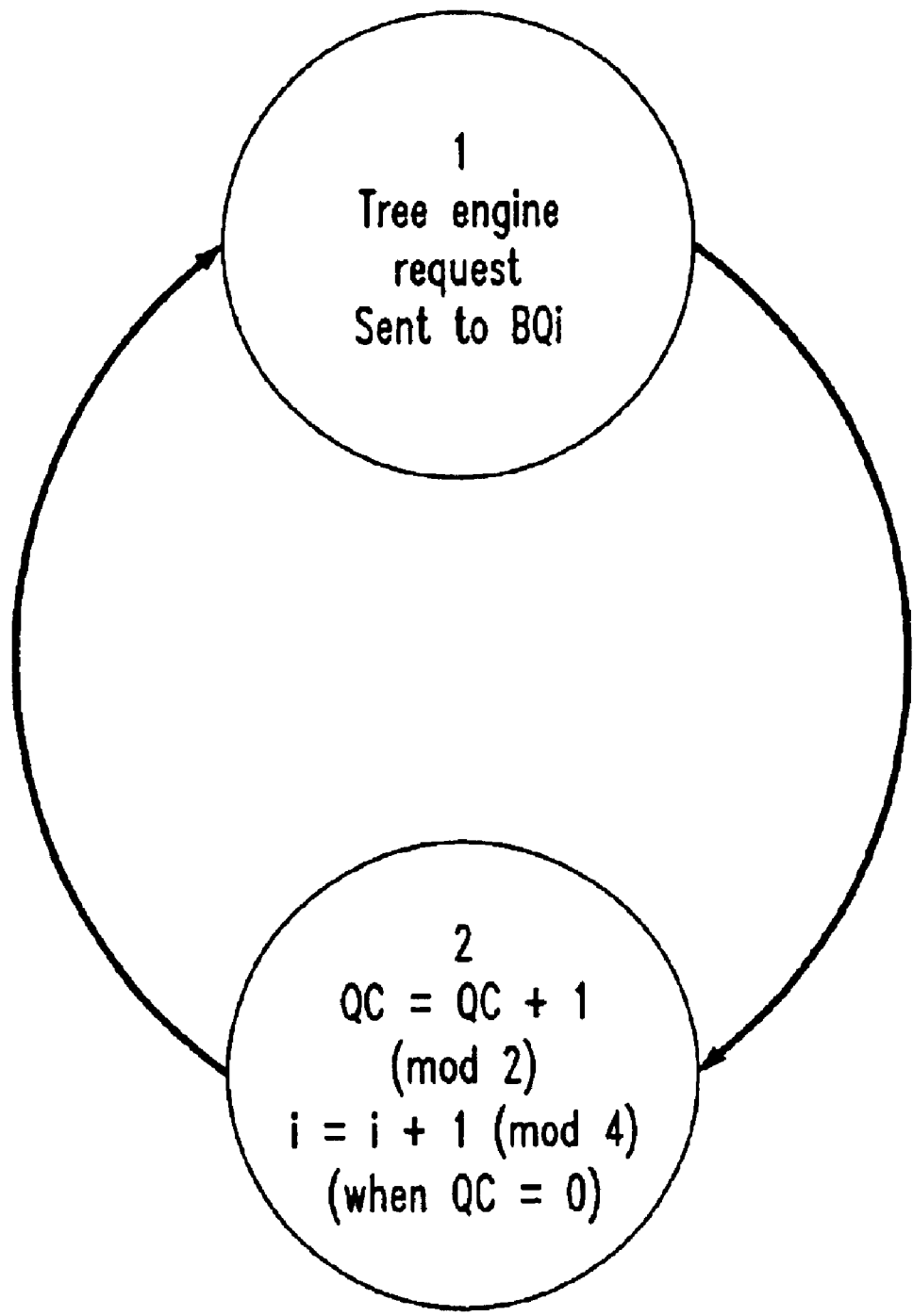
FIG. 2 is a state diagram for sending tree engine requests.
Figure 3:
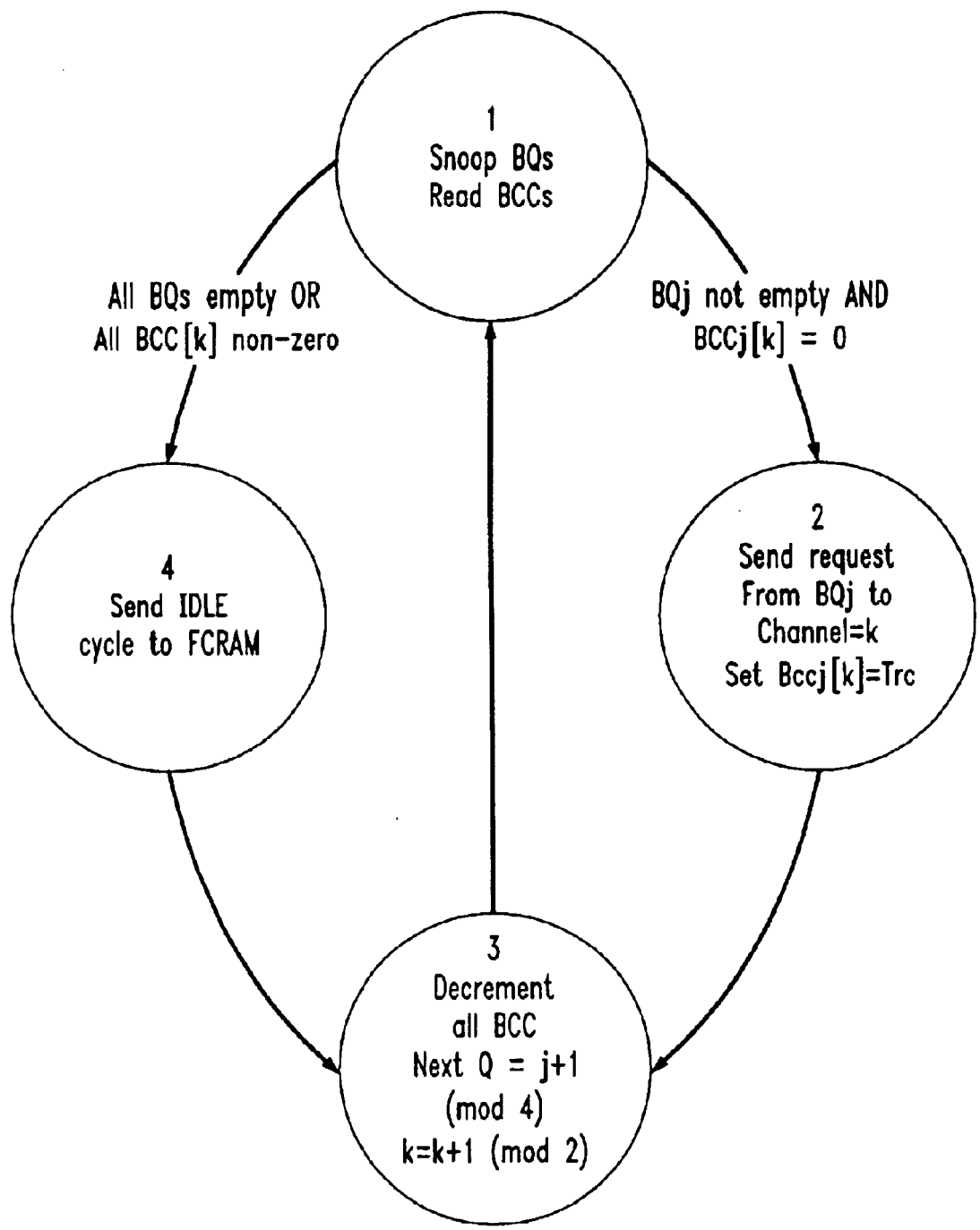
FIG. 3 is a state diagram that schedules access requests.

FIGS. 2 and 3 are concurrent state machines utilized for this method. In the state diagram of FIG. 2, the Tree Engine Request is sent to the appropriate Bank Queue (BQi). The second state assigns the Channel Queue (QC) between one of the two channels and increments the bank index.

While other channel combinations are possible, this embodiment uses the following channel-bank combination:

CH0-B0

CH1-B0

CH0-B1

CH1-B1

CH0-B2

CH1-B2

A check to determine if a refresh interrupt is active must be performed prior to sending an access request. If a refresh interrupt is active, a refresh sequence is sent to both channels simultaneously. While a refresh interrupt is active, access requests are blocked.

In order to optimize efficiency, writes to the Tree Memory Controller 106 occur in bursts. The Host Interface 101 sends several 64-bit words that are queued into a HOST Request FIFO 101 prior to performing the write operation. The amount of queued data is dependent on the Host Processor. An implementation could be a 32×32 bit FIFO where consecutive 32-bit words form a 64-bit data word.

All read access requests are blocked in order to perform a write execution. Then, consecutive 32-bit words are combined to form a 64-bit word. A check is performed to determine if a 64-bit word can be formed. If this word cannot be formed at that time, the Host Request FIFO is blocked and the Tree Engine read requests continue. If a 64-bit word can be formed at that time, data is written in both Channel 0 and Channel 1 simultaneously and the write execution to the Tree Memory Controller 106 is completed.

As indicated in FIG. 3, the update sequence waits until all banks are inactive which can be up to 5 clock cycles. The following sequence is repeated until all data words in the FIFO are written to memory:

1. If the refresh interrupt is active, complete the refresh sequence,
2. Send the address and write the 64-bit data to CH0-B0 and CH1-B0
3. Send the address and write the 64-bit data to CH0-B1 and CH1-B1
4. Send the address and write the 64-bit data to CH0-B2 and CH1-B2

The present invention uses multi-bank scheduling to improve performance on tree accesses in the DRAM based random access memory subsystem. Both independent Channel 0 FCRAM 107 and Channel 1 FCRAM 108 are used. Channel 1 memory is a duplicate of the entire memory in Channel 0.

The Tree Memory Controller 106 in FIG. 1 receives a stream of access read requests 104 to random addresses, A0, A1, A2, A3, A4, etc. It also schedules a stream of requests to the two channels (i.e., Channel 0 FCRAM 107 and Channel 1 FCRAM 108) balancing the load and minimizing bank conflicts. The Tree Memory Controller 106 maintains a queue for each FCRAM bank. The Tree Engine 103 decodes the read address and stores the request in the appropriate bank queue.

One bank conflict counter is maintained for each channel as indicated in FIG. 3. After a read request is sent to the appropriate bank, the bank conflict counter is reset to value that is dependent on the type of counter being used for down counting and whether the zero detect is latched. The value may be the Trc value or Trc plus/minus 1. All bank conflict counters are decremented on each clock cycle. When a bank conflict counter is zero the corresponding bank becomes available. The Tree Memory Controller 106 maintains the pointer to the queue that was last serviced in support of the round robin algorithm scheduling. For each clock cycle, the Tree Memory Controller 106 dispatches the request from the next available bank queue starting from the queue last serviced to an available Channel (i.e., Channel 0 FCRAM 107 or Channel 1 FCRAM 108). A bank queue is available if it is non-empty, and the bank-conflict-counter is zero. A channel is available if a request can be sent and the bank accessed is not busy. No request is sent to the FCRAMs (107 and 108) if none of the bank queues are available. The Tree Memory Controller 106 checks for the refresh interrupt. If the refresh interrupt is active, the refresh request is serviced. After being serviced, a read request can be sent.

Writes to the Tree Memory Controller 106 occur in bursts in order to optimize efficiency. The Host Interface 101 sends several 64-bit words that are queued into a HOST Request FIFO 101 prior to performing the write operation. The amount of queued data is dependent on the Host Processor. An implementation could be a 32×32 bit FIFO where consecutive 32-bit words form a 64-bit data word. The Host Read Data FIFO 102 returns data back to the Host Interface 100.

All read access requests are blocked in order to perform a write execution. Then, consecutive 32-bit words are combined to form a 64-bit word. A check is performed to determine if a 64-bit word can be formed. If this word cannot be formed then, the Host Request FIFO is blocked and the Tree Engine read requests continue until the host sends the remaining word. The update and read accesses are interleaved. As indicated in FIG. 3, the state machine schedules requests from the BQ to FCRAM Channel 0 or Channel 1. The update sequence is as follows:

1. If the refresh interrupt is active, complete the refresh sequence.
2. If the specified bank is busy in either Channel 0 or Channel 1, set access pending flag, which blocks read access from being dispatched to the specified bank for both channels (other banks can continue to be accessed).
3. Wait for the bank conflict counter to reach zero and complete the write to both channels.

While only certain preferred features of the invention have been shown by way of illustration, many modifications and changes will occur to those skilled in the art. It is, therefore, to be understood that the present claims are intended to cover all such modifications and changes, which fall within the true spirit of the invention.

What is claimed is:

1. A method of memory management, comprising:
   providing multiple banks of memory devices organized into independent channels wherein each bank of memory devices contains duplicate data;
   providing a tree memory controller for controlling data read and write accesses to each of the banks in each of the channels;
   establishing a bank queue for each bank in each channel for designating bank availability;
   sending read or write requests to the tree memory controller;
   checking, at the tree memory controller, the availability of each bank in a channel;
   identifying a first available bank; and
   executing the read request from the first available bank;
   wherein controlling a write access includes blocking all read requests;
   confirming that data to be written is complete for the selected memory word length;
   waiting for each bank queue to indicate bank availability for all banks;
   initiating burst mode transfer of the completed data word to all banks concurrently.

2. The method of claim 1 wherein the memory devices comprise dynamic random access memory (DRAM) devices.

3. The method of claim 1 wherein the memory devices comprise fast cycle random access memory (FCRAM) devices.

4. The method of claim 1 wherein the banks of memory devices are organized into two independent channels.

5. A system, comprising:
   multiple banks of memory devices organized into independent channels wherein each bank of memory devices contains duplicate data;
   a tree memory controller for controlling data read and write accesses to each of the banks in each of the channels;
   a bank queue for each bank in each channel for designating bank availability; and
   means for sending read or write requests to the tree memory controller, said controller determining availability of a bank for reading data and executing the read request from a first available bank;
   wherein the controller controls a write access by blocking all read requests, confirming that data to be written is complete for the selected memory word length, waiting for each bank queue to indicate bank availability for all banks, and initiating burst mode transfer of the completed data word to all banks concurrently.

6. The system of claim 5 wherein the controller suspends all read requests during processing of a write request.

7. The system of claim 6 wherein the controller writes to all memory banks concurrently.

8. The system of claim 7 wherein all memory banks contain identical data.

9. The system of claim 5 wherein the memory banks comprise dynamic random access memory devices.

10. The system of claim 5 wherein the memory banks comprise fast cycle random access memory devices.

11. The system of claim 5 wherein the banks of memory devices are arranged in two independent channels.

12. The system of claim 5 wherein the minimum number of memory banks is determined by the ratio of the random cycle time to the random bank access delay.

13. A method of memory management, comprising:
   providing multiple banks of memory devices organized into independent channels wherein each bank of memory devices contains duplicate data;
   providing a tree memory controller for controlling data read and write accesses to each of the banks in each of the channels;
   establishing a read bank queue and a write bank queue for each bank in each channel for designating bank availability;
   sending read or write requests to the tree memory controller;
   checking, at the tree memory controller, the availability of each bank in a channel;
   identifying a first available bank; and
   executing the read request from the first available bank;
   wherein controlling a write access includes blocking all read requests;
   confirming that data to be written is complete for the selected memory word length;
   waiting for each bank queue to indicate bank availability for all banks;
   initiating burst mode transfer of the completed data word to all banks concurrently.

* * * * *